United States Patent [19]
Dietlein

[11] 3,835,906
[45] Sept. 17, 1974

[54] PLASTIC SLEEVE ENCAPSULATED FASTENER LOCKING INSERT AND ASSEMBLY

[76] Inventor: Robert W. Dietlein, 2904 Harmony Pl., La Crescenta, Calif. 91214

[22] Filed: July 17, 1972

[21] Appl. No.: 272,284

[52] U.S. Cl. ............... 151/21 B, 29/447, 151/41.7
[51] Int. Cl. ........................................ F16b 39/284
[58] Field of Search ............ 151/21 B, 41.7, 41.72, 151/41.73, 7; 29/447, 455 LM; 264/230, 266, 274, 275; 52/617

[56] References Cited
UNITED STATES PATENTS

| | | | |
|---|---|---|---|
| 2,027,962 | 1/1936 | Currie | 29/447 X |
| 3,145,752 | 8/1964 | Dupree | 151/21 B |
| 3,285,311 | 11/1966 | Cushman | 151/21 B |
| 3,384,142 | 5/1968 | Phelan | 151/41.73 |
| 3,437,118 | 4/1969 | Coyle | 151/7 |
| 3,550,668 | 12/1970 | Coyle | 151/7 |
| 3,556,570 | 1/1971 | Cosenza | 151/41.72 X |

FOREIGN PATENTS OR APPLICATIONS
471,413 9/1937 Great Britain ................ 151/41.72

*Primary Examiner*—Ramon S. Britts
*Attorney, Agent, or Firm*—William W. Haeflinger

[57] ABSTRACT

An insert assembly, for receiving and retaining a screw fastener, is adapted to be mounted by structure closely enveloping the assembly, and comprises:
  a. a metallic insert sleeve having an interior thread to receive the fastener thread, the sleeve having a wall portion deformed toward the bore interior so that the sleeve thread develops frictional interference with the fastener thread, and
  b. a plastic jacket fitting closely about the sleeve and over the deformed portion so as to provide space therebetween for resilient outward expansion of the deformed wall portion in response to advancing reception of the fastener thread into the sleeve thread and despite close envelopment of the jacket by the retention structure.

5 Claims, 6 Drawing Figures

PATENTED SEP 17 1974　　　　　　　　　　3,835,906
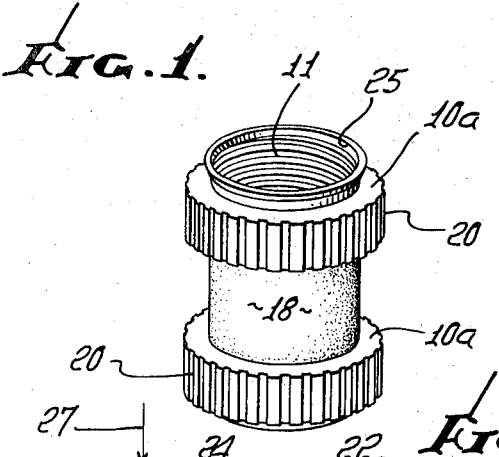
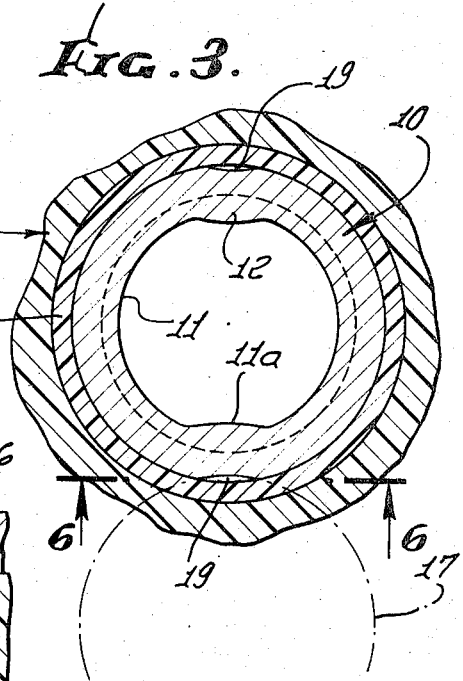
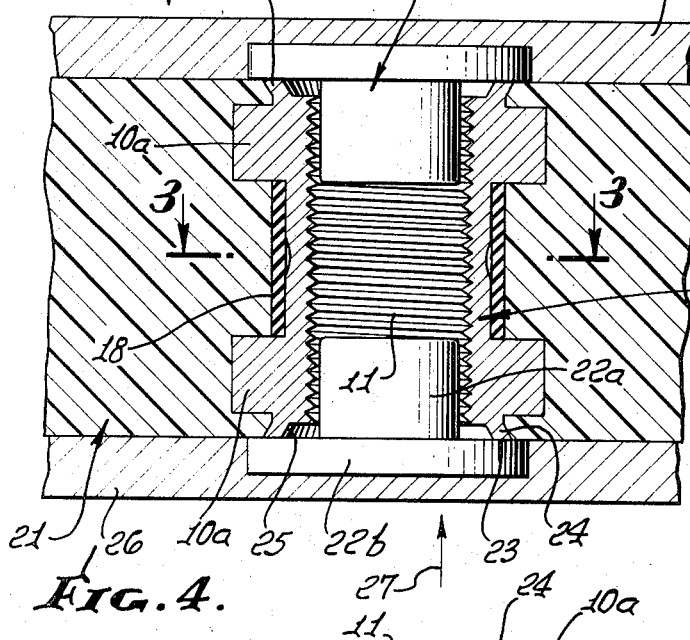
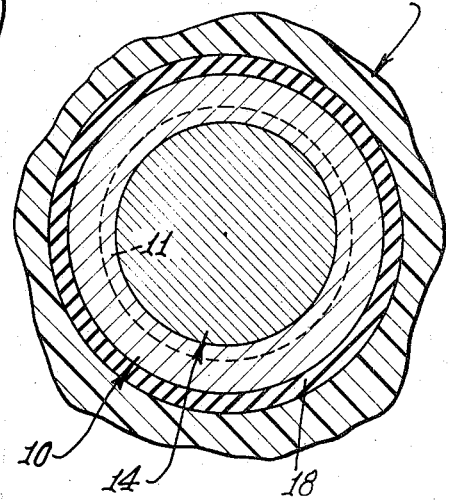
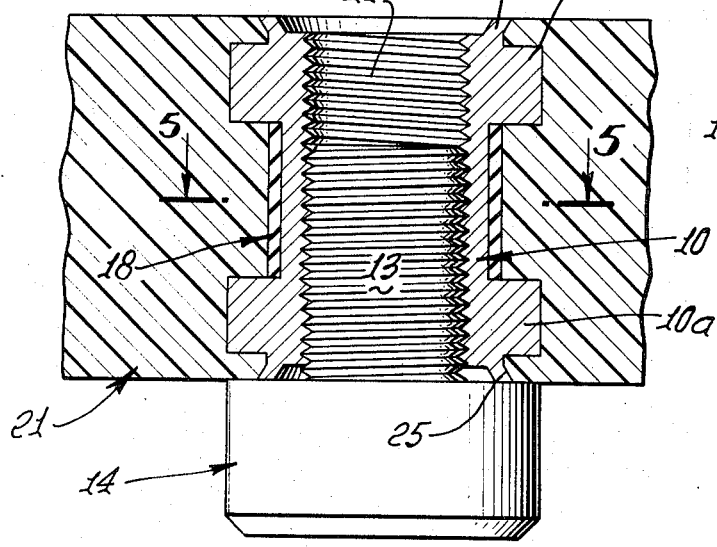
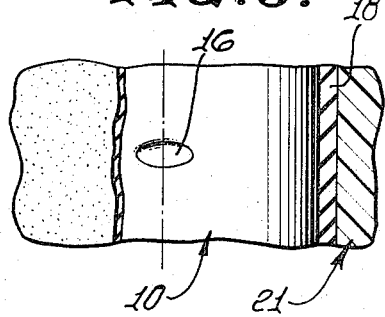

3,835,906

PLASTIC SLEEVE ENCAPSULATED FASTENER LOCKING INSERT AND ASSEMBLY

BACKGROUND OF THE INVENTION

This invention relates generally to fastener locking inserts, and more particularly concerns the encapsulation of miniature inserts in surrounding body material.

When fastener insert sleeves are molded into plastic body material, certain problems arise. Among these are the resistance imposed by the surrounding body to expansion of the sleeve preventing fastener penetration of the insert, the difficulty involved in overcoming such blockage, the problem of dislodgement of the sleeve from the body under use conditions, and unwanted reduction in axial spacing of the insert interior thread. With regard to these combined problems, I am not aware of solutions which offer the unusual advantages in fabrication, structure, mode of operation and results as are now afforded by the present invention.

SUMMARY OF THE INVENTION

It is a major object of the invention to provide simple solutions to all problems referred to above, and also to provide a substantially improved fastener insert assembly which allows desired penetration of the fastener into the insert sleeve despite such molding of the latter into a surrounding plastic body as would normally thwart this desired objective.

Basically, the method of forming the insert assembly involves the steps of deforming a wall portion of the sleeve toward the bore interior to an extent such that the sleeve interior thread will develop desired frictional interference with the fastener thread for locking purposes; and fitting a plastic jacket closely about the sleeve and over the deformed portion so as to provide space therebetween for resilient outward expansion of the deformed wall portion in response to advancing reception of the fastener thread into the sleeve thread. The assembly is then set in mounting structure such as plastic molded about the jacket but without deforming the latter toward the sleeve to an extent eliminating the provided space; thereby allowing the outward expansion referred to.

As will be seen, the jacket may consist of heat shrinkable material so as to be contracted onto the sleeve and between a pair of sleeve flanges. The latter are typically knurled to provide projections interfitting the body plastic material so as to prevent dislodgement of the sleeve from the mounting body plastic. Further, the sleeve may advantageously have wall extent at its terminals ends which are of reduced thickness so as to deform outwardly when endwise force is exerted thereon, preventing reduction in spacing of the insert bore threads. Such force may be exerted by closure pins received at the ends of the insert sleeve during molding.

These and other objects and advantages of the invention, as well as the details of an illustrative embodiment, will be more fully understood from the following description and drawings, in which:

DRAWING DESCRIPTION

FIG. 1 is a perspective showing of an insert assembly according to the invention;

FIG. 2 is an enlarged section through the FIG. 1 insert assembly during molding thereof into a panel body;

FIG. 3 is a section taken on lines 3—3 of FIG. 2;

FIG. 4 is a view like FIG. 2 but showing the insert assembly after molding into the panel body, with a fastener threadably received in the assembly;

FIG. 5 is a section taken on lines 5—5 of FIG. 4; and

FIG. 6 is a fragmentary showing of the insert assembly.

DETAILED DESCRIPTION

In the drawings, a metallic insert sleeve 10 is formed to have an interior thread 11, which may extend lengthwise through the sleeve, to receive a fastener thread 13. A portion of the sleeve wall, as for example portion 12 is inwardly deformed to an extent such that the sleeve interior thread will develop frictional interference with the thread 13 of the fastener 14, in order to resist unscrewing of the fastener from the insert. For example, the deformation may advantageously have the exterior form of a narrow notch 16 elliptically elongated in a circumferential direction, as better seen in FIG. 6. Note the resultant slight inward deformation of the thread 11 at locations 11a in FIG. 3, as a result of a formation of two such notches 16 diametrally opposed as shown. Notch formation may be effected by means of a notching tool (for example a roller) driven locally inwardly against the wall portion 12, one such roller being indicated by the broken lines 17 in FIG. 3.

Next, a plastic jacket (as for example at 18) is fitted closely about the sleeve and over the deformed portion thereof so as to provide space (as for example at 19) between the jacket and sleeve for resilient outward expansion of the deformed wall portion 12 in response to advancing reception of the fastener thread into the sleeve thread. Jacket 18 may consist of heat shrinkable plastic material, examples being irradiated polyvinyl fluoride, irradiated polyolefin, Neoprene and Teflon. It is formed as a ring slipped over the sleeve and heated sufficiently to shrink into engagement with the sleeve but not filling space 19. The resulting thickness of the ring 18 may desirably be less than the thickness of wall portion 12.

The sleeve 10 may include at least one, and typically two metallic flanges 10a near the respective opposite ends of the sleeve, and peripherally knurled to form outward projections 20. Jacket 18 fits between the flanges for retention against endwise displacement from overlying relation to the notches 16.

The jacket and sleeve assembly is next molded into a plastic retainer body such as is indicated at 21 the plastic received about and between the flanges 10a. Such plastic may for example insist of melamine, Bakelite, Nylon or an epoxy resin. For this purpose, pins 22 may first be fitted to the sleeve, with shanks 22a penetrating the sleeve opposite ends and the pin heads 22b engaging the annular opposite ends of the sleeve at 23. In this regard, the end portions of the sleeve may have reduced thickness at 24 so as to be capable of deforming radially outwardly in response to endwise exertion thereon (by the pin heads 22b) of force otherwise sufficient to compress the sleeve (and collapse the threads 11) to an extent preventing ready reception of the fastener threads 13 into the sleeve threads. Note that the sleeve is counterbored at 25 to provide the reduced thickness at 24. Interfitting of the body plastic with the flanges 10a and projections 20 prevents turning of the sleeve in the body as well as endwise displacement.

During molding of the plastic body 21 about the assembly, force may be exerted by the molds 26 (and in the direction of arrows 27) against the pin heads 22b, which tends to compress the sleeve ends 24, outwardly deforming them. The plastic body 21 closely fits the jacket 18, but does not cause the voids 19 to be collapsed.

When the fastener 14 is screwed into the resultant assembly as in FIGS. 4 and 5, the wall portion 12 is allowed to resiliently expand outwardly due to the voids 12, whereby the fastener is not blocked against reception into the sleeve 10. The expansion is exaggerated in FIG. 5.

Merely as illustrative, the overall length of the miniature sleeve and jacket assembly may be about one quarter inch, and the outer diameter of the jacket 18 may be about 0.17 inch.

I claim:

1. In an insert assembly for receiving and retaining a screw fastener, the assembly adapted to be mounted by structure closely enveloping the assembly, the combination comprising
   a. a metallic insert sleeve having an interior thread to receive the fastener thread, the sleeve having a wall portion deformed toward the bore interior defining a thread portion projecting radially inwardly to an extent greater than that of the remainder of the thread so that the sleeve thread develops frictional interference with the fastener thread, and
   b. a plastic jacket fitting closely about the sleeve and over said deformed portion so as to provide space therebetween for resilient outward expansion of said deformed wall portion in response to advancing reception of the fastener thread into the sleeve thread and despite close envelopment of the jacket by said retention structure, the jacket consisting of heat shrinkable non-metallic plastic material,
   c. there being two metallic flanges integral with the sleeve projecting radially outwardly therefrom, the flanges located at opposite ends respectively of the jacket closely axially confining the jacket, the flange maximum diameters exceeding the maximum diameter of the jacket, at least one of the flanges defining a multiplicity of annularly spaced outward projections,
   d. said deformed wall portion locally confined to the mid-section of the sleeve between the flanges, and the jacket engaging substantially the entirety of the sleeve outer surface area between said flanges.

2. The combination of claim 1 including said mounting structure which consists of plastic material molded about said assembly and between the flanges and into annular exterior contact with the jacket.

3. The combination of claim 1 wherein the jacket consists of heat shrinkable material selected from the group that includes polyvinyl fluoride, polyolefin, Neoprene and Teflon, and has ring shape.

4. The combination of claim 3 wherein said deformation has, at the outer surface of the sleeve, the form of a notch elongated in a circumferential direction relative to the sleeve.

5. The combination of claim 1 wherein the sleeve has wall extent at the terminal end thereof which is of sufficiently reduced thickness as to deform outwardly when endwise force is exerted thereon.

* * * * *